(12) United States Patent
Grice et al.

(10) Patent No.: US 8,640,118 B2
(45) Date of Patent: Jan. 28, 2014

(54) MANAGING FIRMWARE ON A SYSTEM BOARD

(75) Inventors: Jonathan Grice, Raleigh, NC (US); Emil Paul Parker, Youngsville, NC (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 13/114,477

(22) Filed: May 24, 2011

(65) Prior Publication Data

US 2012/0303940 A1    Nov. 29, 2012

(51) Int. Cl.
*G06F 9/44* (2006.01)
*G06F 9/445* (2006.01)

(52) U.S. Cl.
USPC .......................... 717/168; 717/170; 717/174

(58) Field of Classification Search
None
See application file for complete search history.

(56) References Cited

U.S. PATENT DOCUMENTS

| | | | |
|---|---|---|---|
| 6,044,411 A | 3/2000 | Berglund et al. | |
| 7,240,188 B2 * | 7/2007 | Takata et al. | 713/1 |
| 7,590,835 B1 * | 9/2009 | Nallagatla et al. | 717/170 |
| 7,590,883 B2 | 9/2009 | Engle et al. | |
| 7,797,696 B1 * | 9/2010 | Nallagatla et al. | 717/168 |
| 7,849,454 B2 * | 12/2010 | Lambert et al. | 717/170 |
| 7,996,829 B2 * | 8/2011 | Depew et al. | 717/174 |
| 8,328,100 B2 * | 12/2012 | Gordon et al. | 717/174 |
| 8,392,904 B2 * | 3/2013 | Garcia et al. | 717/170 |
| 8,468,333 B1 * | 6/2013 | Nallagatla et al. | 717/168 |
| 2004/0199615 A1 * | 10/2004 | Philyaw | 717/168 |
| 2004/0215569 A1 | 10/2004 | Agha et al. | |
| 2004/0255286 A1 * | 12/2004 | Rothman et al. | 717/168 |
| 2005/0182851 A1 * | 8/2005 | Buckler et al. | 717/168 |
| 2007/0169088 A1 * | 7/2007 | Lambert et al. | 717/168 |
| 2008/0052702 A1 * | 2/2008 | Chuang | 717/170 |
| 2008/0115122 A1 * | 5/2008 | Wang | 717/168 |
| 2008/0141236 A1 * | 6/2008 | Buckler et al. | 717/168 |
| 2008/0256525 A1 * | 10/2008 | Ellsworth et al. | 717/168 |
| 2009/0222804 A1 * | 9/2009 | Kaufman et al. | 717/168 |
| 2009/0287918 A1 * | 11/2009 | Goldstein et al. | 713/2 |
| 2011/0179407 A1 * | 7/2011 | Minegishi | 717/168 |
| 2012/0131565 A1 * | 5/2012 | Zhang | 717/168 |

OTHER PUBLICATIONS

Skalsky et al., "Introducing UEFI-Compliant Firmware on IBM System x and BladeCenter Servers", 2011 IBM Corporation, pp. 1-29; <server007.tistory.com/.../cfile7.uf#1562143A4F500C12371B50.pdf>.*

Mayama et al., "Design of Firmware Update System of RT-Middleware for Embedded System", 2010 IEEE, pp. 2818-2822; <http://ieeexplore.ieee.org/stamp/stamp.jsp?tp=&arnumber=5602590>.*

Kim et al., "Remote Progressive Firmware Update for Flash-Based Networked Embedded Systems", 2009 ACM, pp. 407-412; <http://dl.acm.org/citation.cfm?doid=1594233.1594337>.*

(Continued)

*Primary Examiner* — Thuy Dao
*Assistant Examiner* — Ben C Wang
(74) *Attorney, Agent, or Firm* — Jason H. Sosa; Arthur Samodovitz (57) ABSTRACT

An embodiment includes a computer comprising a system board and a removable programmable storage device. If the system board is replaced, the removable programmable storage device may be transferred to the replacement system board for the automatic transfer of information to the replacement system board and configuration of the replacement system board. In one embodiment, the computer receives a start up command. The computer determines whether a firmware image on the system board matches a firmware image on the removable programmable storage device. Based on determining that the firmware images do not match (when the system board is replaced with a new system board, for example), the computer replaces the firmware image on the system board with the firmware image on the removable programmable storage device. After the check and replacement, the computer proceeds with boot sequences.

12 Claims, 5 Drawing Sheets

(56) References Cited

OTHER PUBLICATIONS

Bettermann et al. "Product Data Compile During Bring Up Execution." IP.com. IPCOM000058884D Original Publication Date: Jan. 1, 1988. IP.com Electronic Publication date: Feb. 15, 2005.

Bettermann et al. "Fault Tolerant Disk File Vital Product Data." IP.com. IPCOM000056610D Original Publication date: Jan. 1, 1988. IP.com Electronic Publication date: Feb. 14, 2005.

* cited by examiner

MANAGING FIRMWARE ON A SYSTEM BOARD

FIELD OF THE INVENTION

The present invention relates generally to computer systems management, and more specifically to the maintenance of firmware and settings on a system board.

BACKGROUND OF THE INVENTION

It was known for a computer to have a field-replaceable unit (FRU) which is directly or indirectly connected to a system board to provide vital product data ("VPD") to components on the system board. (Alternately, the VPD can be stored in a permanent component in the system board, such as a chip soldered onto a board.) VPD typically includes a serial number and a type number of either the system board or the computer as a whole (referred to as "system vital product data").

It was known for an FRU to take the form of a physical module plugged into a USB socket of a system board. Such FRUs have been plugged into known system boards or "blades" of IBM BladeCenter® computers to provide VPD. Consequently, when replacing a system board, a technician can simply unplug the known FRU from the old system board and plug the same FRU into the new system board to transfer the VPD to the new system board.

A computer system board typically includes firmware to provide a Unified Extensible Firmware Interface (UEFI) or alternatively the BIOS, diagnostics code such as Dynamic System Analysis (DSA), the Integrated Management Module (IMM), and even field-programmable gate arrays (FPGA). The basic functionality of the firmware is tailored to the specific system on which it runs, and when the system board is replaced, the replacement system board must be updated with the correct firmware. The technician may also need to update the firmware of the new system board to operate and synchronize with other components elsewhere in the computer.

Furthermore, settings or user preferences corresponding to the above mentioned firmware functionalities must also be reset or entered in the replacement system board. In the prior art, the technician updated the firmware and settings in the new system board by querying the system, prior to replacement, for current versions of firmware running and for current settings used by the firmware. Alternatively, the technician could receive this information from an owner or user of the system if they kept track of the installed firmware and selected settings. The technician could then obtain a copy of the correct firmware version from the producer of that version. After replacing the system board, the technician would use a boot disk containing the correct firmware versions to load the firmware on the replacement system board. After installing the correct firmware, the technician would manually enter the settings from the original system board into the replacement system board.

SUMMARY

The present invention resides in a system, method and program product for updating firmware in a system board of a computer via a removable programmable storage device. The removable programmable storage device is directly or indirectly connected to the system board. The computer determines whether a firmware image on the system board matches a firmware image on the removable programmable storage device. If not, the computer replaces the firmware image on the system board with the firmware image on the removable programmable storage device. Subsequently, the computer proceeds with boot sequences.

DETAILED DESCRIPTION

Detailed embodiments of the present invention are disclosed herein with reference to the accompanying drawings; however, it is to be understood that the disclosed embodiments are merely illustrative of potential embodiments of the invention and may take various forms. This description is intended to be interpreted merely as a representative basis for teaching one skilled in the art to variously employ the various aspects of the present invention.

Figure 1:
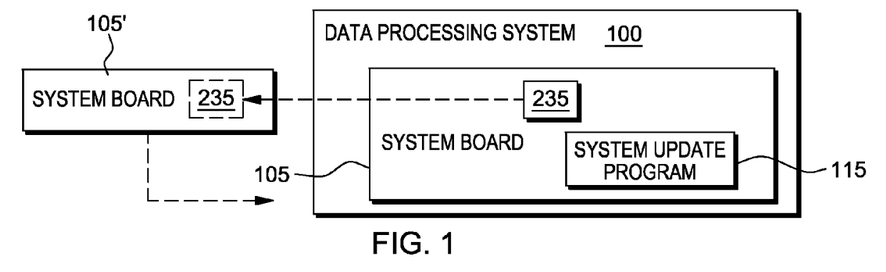
FIG. 1 illustrates a data processing system, in which the present invention may be implemented, and includes a system board and a removable programmable storage device plugged into the system board.

FIG. 1 illustrates a data processing system in which the present invention may be implemented. Data processing system 100 includes an original system board 105, which is currently installed in system 100 but replaceable, and an FRU 235. FRU 235 is or includes a programmable storage device and is removably attached to board 105, for example by a Universal Serial Bus ("USB") connector. System board 105 contains various hardware components and connecting circuitry, and stores various data, settings, and firmware instructions necessary for data processing system 100 to operate. System board 105' is a replacement system board for original system board 105, and includes similar hardware and software. Upon replacement of original system board 105 by system board 105', FRU 235 is transferred from the original system board 105 to the system board 105', for example, by unplugging the FRU 235 from the USB socket of the original system board and plugging the FRU 235 into the USB socket of the replacement board.

Figure 2:
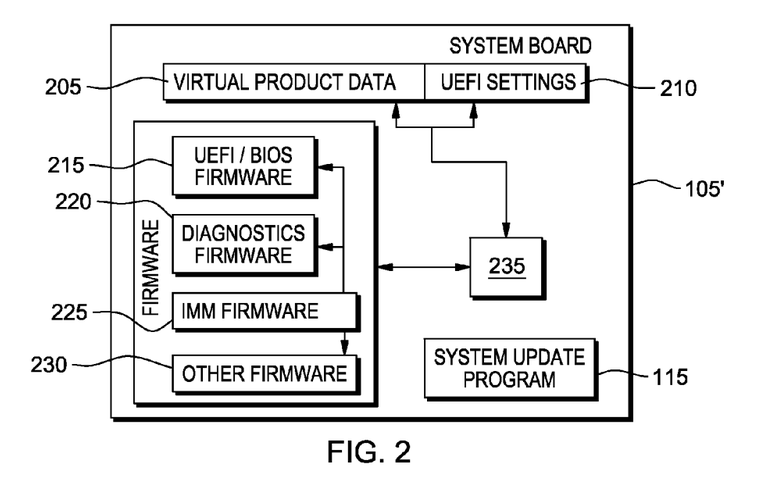
FIG. 2 illustrates firmware and data on the system board of FIG. 1 in accordance with an embodiment of the present invention.

Data processing system 100 may also comprise internal components as depicted in FIG. 2. Original system board 105 and replacement system board 105' include a system update program 115 according to the present invention, although if desired, program 115 may reside on another board logically coupled to the system board 105 or 105' which is currently installed, to manage the firmware and related settings on the system board. System update program 115 provides the functionality to synchronize current firmware, settings, and VPD on a system board with updated versions of the same on FRU 235.

The firmware on system board 105' can include UEFI firmware 215, which establishes routines and parameters for communication between system hardware and operating system software. UEFI firmware 215 may also define an interface between the operating system and other platform firmware. UEFI firmware 215 can take the place of traditional BIOS firmware. In another embodiment, BIOS firmware resides on the system board, and UEFI firmware 215 executes on top of the BIOS.

System board 105' also stores and uses diagnostics firmware 220. Diagnostics firmware 220 directs hardware interrogation calls to implement routines; benchmarks cache, memory, and CPU performance; tests RAM; and may test COM ports. Diagnostics firmware 220 may comprise IBM® Dynamic System Analysis (DSA) to collect and analyze system information to aid in diagnosing system problems.

Also included in the illustrated embodiment is Integrated Management Module (IMM) firmware 225. The IMM is a module comprising IMM firmware 225, which manages the system. The IMM replaces the baseboard management controller (BMC) and consolidates the service processor functionality, Super I/O, video controller, and remote presence capabilities in a single chip on a server system board, such as system board 105'. IMM firmware 225 is the instructions and routines that perform these functionalities. In another embodiment, system board 105' includes firmware for the BMC instead of the IMM.

System board 105' includes other firmware 230 needed to operate data processing system 100. Other firmware 230 may include field-programmable gate arrays (FPGA) and other routines necessary depending on vendors (e.g., Broadcom®, FLI®) and platforms used.

In the embodiment of FIG. 2, system board 105' stores VPD 205 and UEFI settings 210. UEFI settings 210 are user configurable preferences a user may set for UEFI firmware 215.

FRU 235 is connected to system board 105' after replacement of original system board 105 and stores copies and/or updates of the VPD 205, UEFI firmware 215, diagnostics firmware 220, IMM firmware 225, other firmware 230, and UEFI settings 210.

In accordance with the preferred embodiment of the invention, system update program 115 is also stored as firmware by replacement system board 105' to synchronize versions of firmware and data on system board 105' and FRU 235. System update program 115 can be written in various programming languages including low-level, high-level, object-oriented or non object-oriented languages. Alternatively, the functions of system update program 115 can be implemented in whole or in part by computer circuits and other hardware.

System update program 115 compares data, i.e., VPD or configuration settings for UEFI, stored on system board 105' to data stored on FRU 235 and updates either the data on system board 105' or the data on FRU 235 by determining if one version of the data does not match the other, and if they do not match, which version is correct. System update program 115 also provides similar comparison capabilities for firmware, with the addition of being able to compare version numbers saved in a header or a line by line comparison of separate firmware images. IMM firmware 225 is responsible for flashing all firmware, including itself. System update program 115 may enable communication between IMM firmware 225 and removable programmable storage device 235 to determine when the IMM flashes firmware on system board 105' with the firmware images on FRU 235. In another embodiment, system update program 115 is part of IMM firmware 225.

Figure 3:
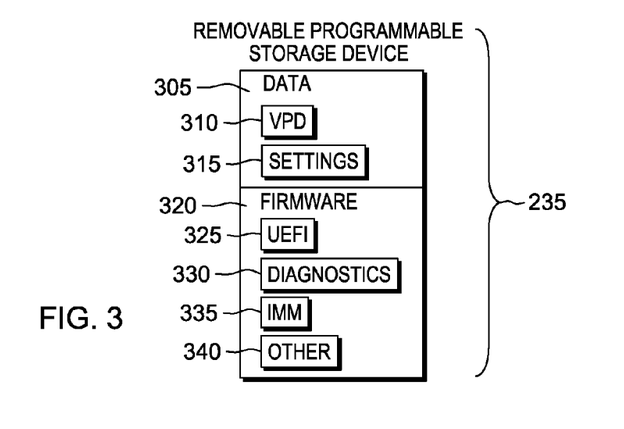
FIG. 3 depicts firmware and data stored on the removable programmable storage device of FIG. 1 in accordance with an embodiment of the present invention.

FIG. 3 depicts firmware and data stored on FRU 235 in accordance with an embodiment of the invention. FRU 235 is partitioned into data partition 305 and firmware partition 320. Data partition 305 includes VPD 310 and settings 315. VPD 310 is either a copy of vital product data 205 or an update for vital product data 205. Settings 315 may include various copies of settings and preference for system board 105', such as UEFI settings 210, or updates for these settings.

Firmware partition 320 is accessible to IMM firmware 225, so that firmware images may be flashed (by IMM firmware 225) onto system board 105' or FRU 235 as necessary. In other embodiments, firmware other than IMM firmware 225 may flash firmware images. Firmware partition 320 includes firmware copies/updates UEFI 325, Diagnostics 330, IMM 335, and other firmware 340.

Figure 4:
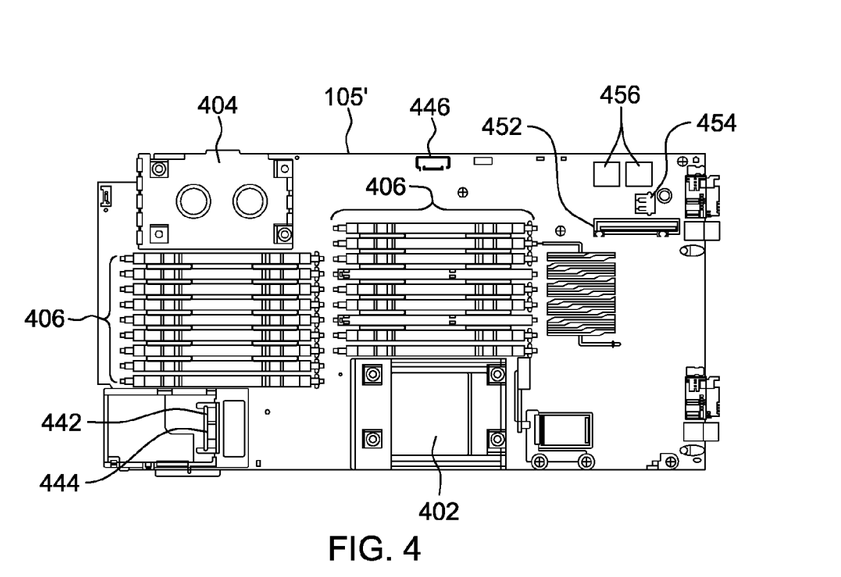
FIG. 4 illustrates the system board of FIG. 1 and attached hardware components in accordance with an embodiment of the present invention.

FIG. 4 illustrates system board 105' and attached hardware components in accordance with an embodiment of the invention. In the depicted embodiment, system board 105' is the system board of a data storage blade in an IBM Blade-Center®. In other embodiments, system board 105' may be the system board of any computer system.

System board 105' includes processors 402 and 404. Processors 402 and 404 execute instructions of the operating system and program instructions of both software and firmware, including system update program 115, UEFI firmware 215, Diagnostics firmware 220, and other firmware 230 on system board 105. System update program 115, UEFI firmware 215, Diagnostics firmware 220, and other firmware 230 are stored on one or more computer-readable tangible storage devices 442, 446, and 456 for execution by one or more of processors 402 and 404 via one or more respective RAMs 406 (which typically include cache memory). Other processors may exist to operate program instructions. For example, in a preferred embodiment, the IMM (and hence IMM firmware 225) runs on its own embedded processor separate from system board processors 402 and 404. Since the IMM is responsible for updating firmware, such a processor may also run system update program 115.

In the depicted embodiment of FIG. 4, computer-readable tangible storage devices 442, 444, and 456 include solid-state drives (442 and 444) and onboard chips (456). Alternatively, any of computer-readable tangible storage devices 442, 444, and 456 may be a magnetic disk storage device of an internal hard drive, a semiconductor storage device such as ROM, EPROM, flash memory or any other computer-readable storage device that can store a computer program and digital information. The term "computer-readable tangible storage device" does not include a signal propagation media such as a copper transmission cable, an optical transmission fiber or a wireless transmission media. Stored digital information may include VPD and system settings. Firmware, VPD and system settings are stored in non-volatile memory, preferably in onboard chips 456. Typically, onboard chips 456 used for firmware are flash ROM.

In the shown embodiment, RAM 406 includes dual in-line memory modules (DIMM). In another embodiment RAM 406, such as a cache memory, may come as an onboard chip. Battery 446 provides back-up power to RAM 406 when it is desirable for RAM 406 to be non-volatile.

USB connector 454 connects an internal USB key (such as FRU 235 (not shown)) to system board 105'. Other embodiments may include connectors for other types of removable programmable storage devices, such as smart chips or FRUs having programmable storage components. I/O expansion connector 452 is one such connector which allows for a FRU (not shown) (in this case an expansion card) to be coupled to system board 105'.

Other embodiments of systems may include additional internal components, such as a R/W drive or interface to read from and write to one or more portable computer-readable tangible storage devices, such as a CD-ROM, DVD, memory stick, magnetic tape, magnetic disk, optical disk or semiconductor storage device. Internal components may also include a network adapter or interface such as a TCP/IP adapter card, to connect the system to other systems and devices in a network. The network may comprise copper wires, optical fibers, wireless transmission, routers, firewalls, switches, gateway computers and/or edge servers.

Systems may also include external components such as a computer display monitor, a keyboard, and a computer mouse. In such an embodiment, internal components include device drivers to interface to the computer display monitor, the keyboard, and the computer mouse.

Figure 5:
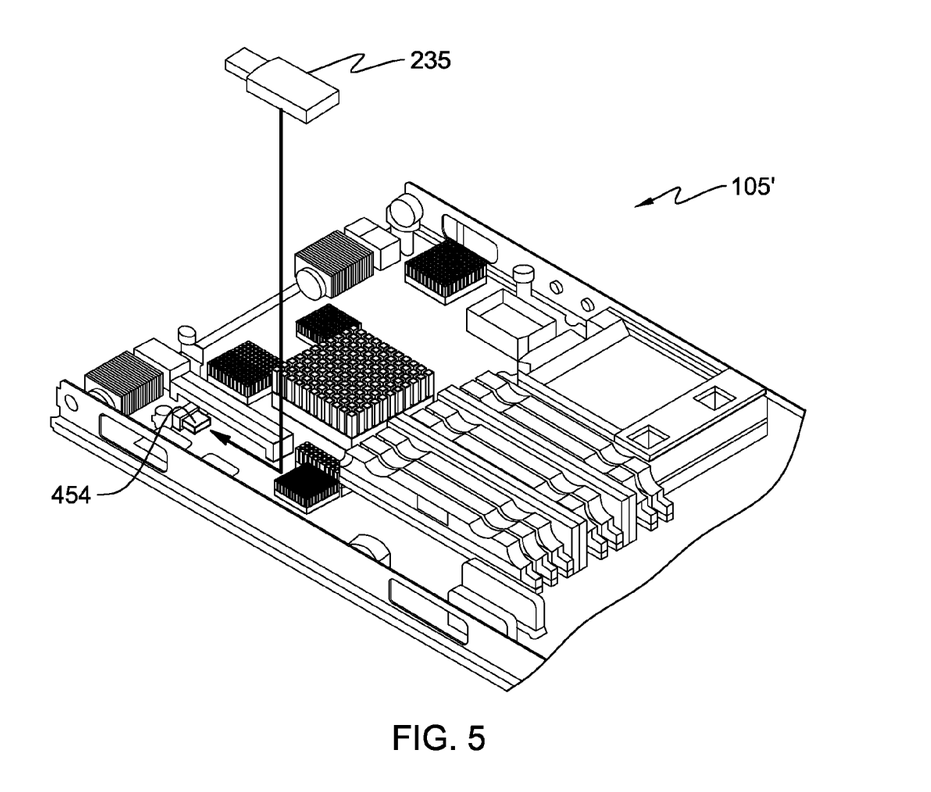
FIG. 5 depicts the removable programmable storage device of FIG. 1 joining with a corresponding connector on the system board of FIG. 1 in accordance with an embodiment of the present invention.

FIG. 5 depicts the FRU 235 joining with the corresponding connector 454 on system board 105' in accordance with an illustrative embodiment. In this preferred embodiment, FRU 235 is an internal USB key that joins with system board 105' by sliding into USB connector 454. A USB key is ideal for FRU 235 because some server systems already allow for internal USB connections, a USB key is both programmable and capable of partitioning, and a USB key has the capacity to store large amounts of data.

Figure 6A:
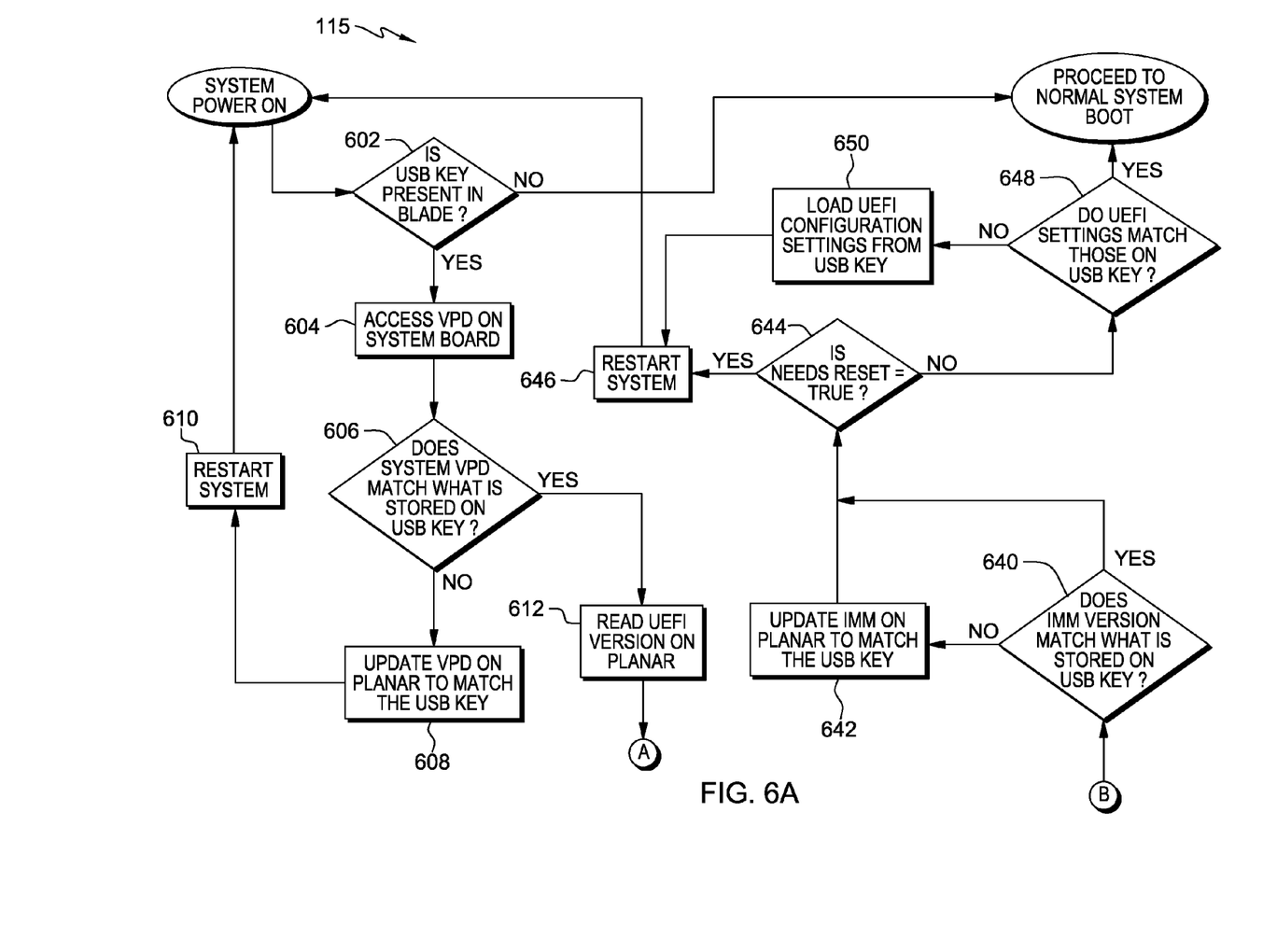
FIGS. 6A and 6B illustrate a flowchart of the steps of a system update program within the system board of FIG. 1 in accordance with an embodiment of the present invention.
Figure 6B:
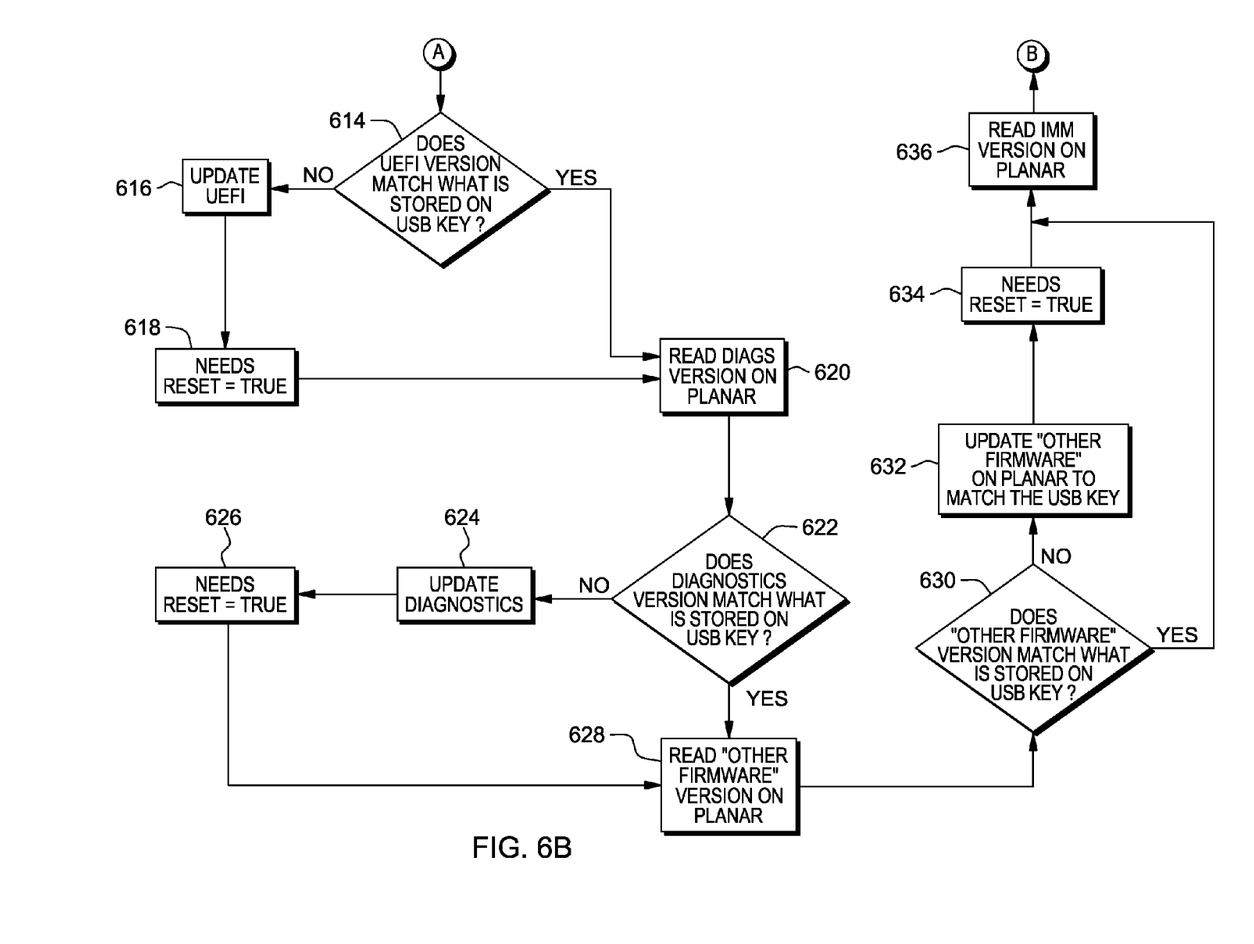

FIG. 6 illustrates a flowchart of the steps of system update program 115 in accordance with an embodiment of the invention.

In a power-on sequence, system update program 115 detects the presence (or absence) of a USB key present on a system board (decision block 602). In other embodiments, the USB key may be on a FRU connecting to the system board and may even be connected to the system externally. Alternatively, in place of a USB key, embodiments of the invention may include any removable, programmable storage device.

If system update program 115 does not detect the USB key, system update program 115 proceeds to system boot sequences. If system update program 115 detects the USB key (decision 602, yes branch), system update program 115 accesses VPD on the system board (step 604). In another embodiment, system update program 115 equates a blank USB key to no USB connection and proceeds to system boot sequences.

Next, system update program 115 compares the VPD on the system board to VPD on the USB key, preferably via a line-by-line comparison, to determine if the VPDs match (decision block 606). If the VPD does not match (decision 606, no branch), system update program 115 replaces or updates VPD on the system board with VPD on the USB key (step 608). Following a VPD update, system update program 115 restarts the system (step 610).

VPD need not be checked prior to checking the firmware and settings in all embodiments; however, checking VPD first is preferable in order to ensure that firmware updating takes place on the correct system. In another embodiment, before updating VPD on the system board (step 608), system update program 115 provides a user interface to allow user confirmation for the update. Allowing user confirmation is an embodiment for subsequent updates described.

If the VPD does match, system update program 115 reads the UEFI version on the system board (step 612). System update program 115 determines if the UEFI version on the system board matches the UEFI version on the USB key (decision block 614). The UEFI version can normally be found in the firmware header. If the version cannot be found, in an alternative embodiment, system update program 115 may compare the entire firmware image of the UEFI on the system board with the entire firmware image of the UEFI on the USB key.

If the UEFI versions do not match, system update program 115 updates the UEFI firmware on the system board by copying and substituting the UEFI firmware from the USB key (step 616). In a preferred embodiment, where the system contains an IMM, the IMM is responsible for flashing firmware, including itself, when necessary. In such an embodiment, the IMM retrieves the UEFI firmware image from the USB key and flashes the storage component maintaining the UEFI firmware image on the system board.

Because there is other firmware to check and potentially update, system update program 115 sets a reset parameter to 'TRUE' (step 618) so that a system restart may be affected prior to boot sequences.

In response to system update program 115 determining that the UEFI versions matched in determination block 614, or alternatively upon a UEFI update and setting of a reset parameter (steps 616 and 618, respectively), system update program 115 proceeds to read the diagnostics version on the system board (step 620). In a preferred embodiment, diagnostics firmware comprises Dynamic System Analysis (DSA) code.

System update program 115 determines whether the diagnostics version on the system board matches the diagnostics version on the USB key (decision block 622). If the versions do not match, system update program 115 flashes (through the IMM) the diagnostics firmware on the system board with the diagnostics firmware image on the USB key (step 624), and sets the reset parameter to 'TRUE' (step 626).

After setting the reset parameter, or alternatively after determining that the diagnostics versions match, system update program 115 reads another firmware version on the system board (step 628) and determines if the other firmware version matches the version on the USB key (decision block 630). This step is exemplary in that system update program 115 systematically scrolls through the different firmware implementations and compares and updates where the firmware on the system board does not match the firmware on the USB key. While UEFI and diagnostics are found on most system boards, other firmware on the system board is largely dependent on the type of system and the vendor of the system. System update program 115 may check all updateable firmware of the system.

In response to system update program 115 finding that versions of the other firmware on the system board and USB key do not match, system update program 115 updates (flashes) the firmware on the board with the firmware image from the USB key (step 632) and sets the reset parameter to 'TRUE' (step 634).

After system update program 115 sets the parameter, or alternatively, after system update program 115 determines that the versions do in fact match, system update program 115 proceeds to read the IMM firmware version on the system board (step 636). System update program 115 determines if the IMM version on the system board matches the IMM version on the USB key (decision block 640) and updates (flashes) the IMM firmware on the system board if the versions do not match (step 642). In a preferred embodiment, system update program 115 checks/updates the IMM firmware subsequent to other firmware. The IMM has the capability to flash itself. Unlike other firmware, if the IMM firmware is updated, the system does not require a restart before the system can be booted.

After system update program 115 either updates the IMM firmware or determines that the IMM versions match and no update is necessary, system update program 115 determines whether the reset parameter has been set to 'TRUE' throughout the course of the program (decision block 644). If the reset parameter has been set, system update program 115 restarts the system (step 646). If the parameter has not been set, system update program 115 determines if UEFI settings (start-up settings) on the system board match UEFI settings on the USB key (decision block 648). UEFI settings are different than the UEFI firmware. UEFI settings are user controlled (user configurable), allowing a user to input preferences to control how the UEFI firmware executes.

If the UEFI settings do not match, system update program 115 loads the UEFI configuration settings from the USB key to the system board (step 650) and restarts the system (step 646). If the UEFI settings do match, system update program 115 proceeds to boot the system.

In other embodiments the order in which VPD, firmware, and user settings are checked/updated may be varied.

In this manner, a technician may install a system board, transfer a USB key maintaining current versions of the system's firmware/settings/VPD to the system board, and power on the system to allow system update program 115 to perform any necessary updates to the system board.

Of course, to be effective, the USB key (or whatever removable programmable storage device is used in a specific embodiment) should in fact have the current versions of the system firmware.

There exist a number of ways to provide and/or synchronize the firmware from the system board to the removable programmable storage device (hereinafter referred to as removable storage):

The simplest and preferred way is that whenever there is an update for the system (firmware, settings, etc.), system update program 115 (or some other functionality) updates the removable storage first, and then updates the system from the removable storage. The IMM, or alternatively the BMC, of the system has access to any removable storage, typically via the UEFI or BIOS of the system. As previously discussed, under current standards, the IMM is responsible for flashing all firmware including itself. Updating the removable storage may be done through any of the same methods used to update firmware currently.

For example, a new firmware image could be passed to the IMM via a web gui (such as the IMM web interface), supplied through a command line interface, or passed over an internal network interface. Alternatively, the new firmware image may be received through another local removable storage. Once the IMM has the firmware image, the IMM flashes (updates) the corresponding existing firmware image on the removable storage with the new firmware image. This may be implemented by adding an extra command line argument (if the firmware image is passed through a command line interface) or checkbox (if the firmware image is passed through a user interface) to indicate that the removable storage should be updated with the new firmware image, instead of the system board. Alternatively, this may be a default setting. On the next system start, the code/firmware on the system is flashed from the updated removable storage. Alternatively, the IMM could simply update (flash) both the removable storage and the system with the new firmware image upon receiving the firmware update.

In another embodiment, the removable storage may be transferred to another system (such as a field technician's laptop) to receive updates for the firmware of the original system.

In another embodiment still, a hardware jumper or a software selection could indicate which code/firmware image should take precedence, the one on the removable storage or the one on the system. If the jumper or selection indicates that the removable storage has the master copy, then the steps of system update program 115 would be performed at startup to check and update the system board. However, if the jumper or selection indicates that the system has the master copy, then the steps of system update program 115 would change insofar as any updating would occur to the removable storage from the system board.

In yet another embodiment, if at startup a blank removable storage is detected, the system formats the removable storage and copies current firmware/settings/VPD onto the removable storage.

By having the removable storage always contain the current state of the machine (most importantly the UEFI/BIOS firmware and settings) it assures that a new system board in the system boots up with the same code and settings as the system board it replaces.

Figure 7A:
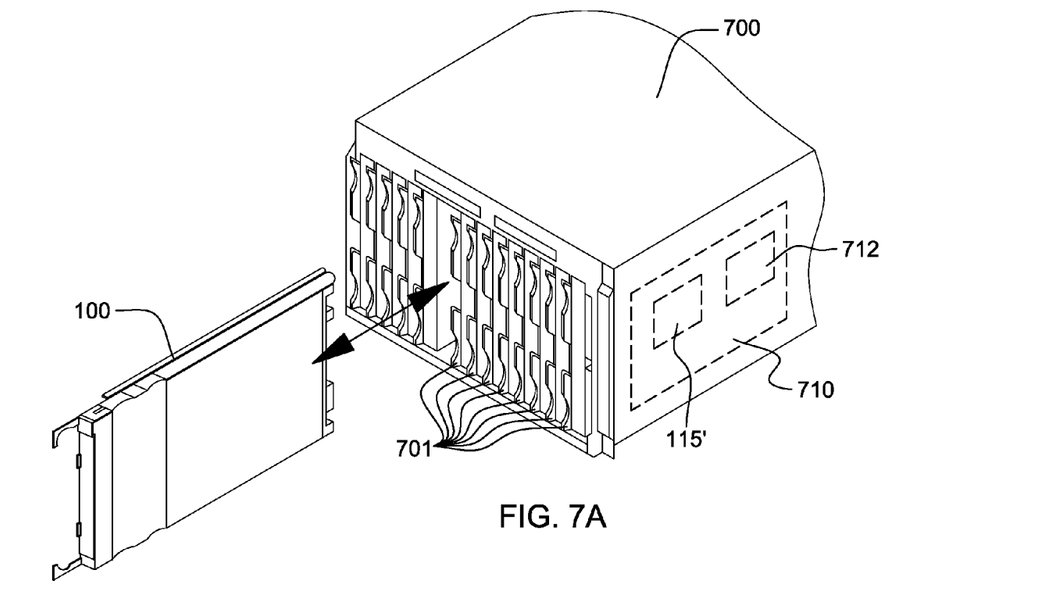
FIGS. 7A and 7B depict a chassis of a BladeCenter® interconnecting a number of server systems, including the data processing system of FIG. 1, and an advanced management module in accordance with an embodiment of the present invention.
Figure 7B:
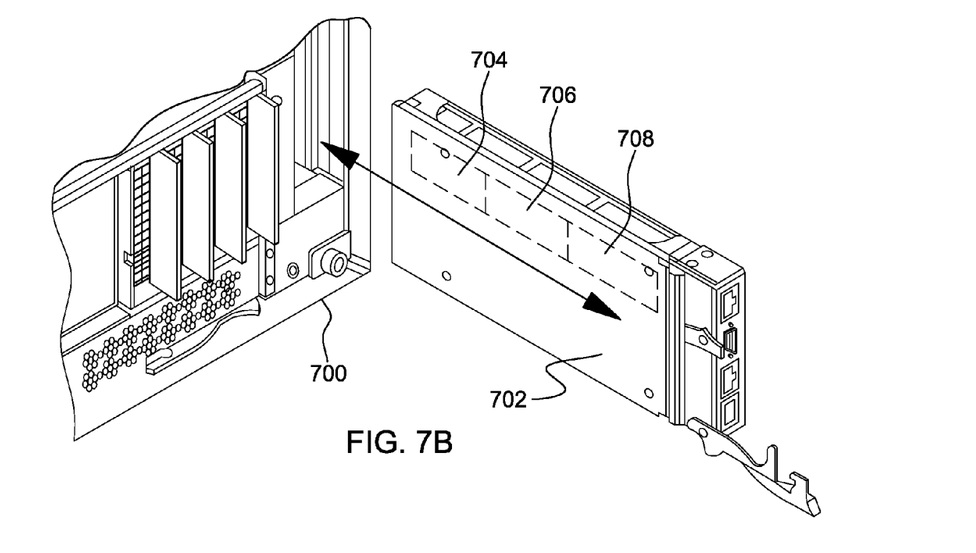

In furtherance of the goal of maintaining the most recent version of firmware, FIGS. 7A and 7B depict a chassis of a BladeCenter® interconnecting a number of server systems, including data processing system 100, and an advanced management module in accordance with an illustrative embodiment. Server systems 701, including data processing system 100, connect through the front of chassis 700. One of server systems 701, other than data processing system 100, has a system board 710, which connects to its own FRU 712. System board 710 may run a copy of system update program 115, hereafter referred to as system update program 115'.

Advanced management module (AMM) 702 connects through the back of chassis 700. AMM 702 is an independent, hot-swappable module that can be used to configure and manage all installed BladeCenter® components. AMM 702 provides system-management functions for all the server systems 701 in chassis 700. AMM 702 may also be referred to as the chassis management module. AMM 702 has its own internal circuit board 704, memory devices 706, and processor(s) 708.

Server systems 701 and data processing system 100 can only manage their own internal systems, respectively. AMM 702, on the other hand, has the capability to both keep track of versions of firmware running on each respective server system 701 and update that firmware.

In one embodiment, AMM 702 is responsible for updating UEFI firmware 215, diagnostics firmware 220, IMM firmware 225, and other firmware 230, of system board 105' by flashing UEFI 325, diagnostics 330, IMM 335, and other firmware 340 of FRU 235.

In another embodiment of the present invention, during start-up, system update program 115 determines whether versions of firmware 215, 220, 225, and 230 on system board 105' match versions of firmware 325, 330, 335, and 340 on FRU 235. Responsive to determining that one or more the versions do not match, system update program 115 determines which versions are the most recent. If the firmware version on system board 105' is more recent than the firmware version on FRU 235, system update program 115 flashes FRU 235 with the firmware version from system board 105'. Additionally, this may be indicative of firmware being outdated on other server systems throughout chassis 700. System update program 115 sends the new version of firmware from system board 105' to AMM 702 for distribution to server systems 701.

System update program 115 also queries AMM 702 for updates sent by other server systems 701. For example, if system board 710 on one of server systems 701 is a replacement system board, and system update program 115' determines that firmware on system board 710 should update firmware on FRU 712, system update program 115' flashes FRU 712 and also sends the new firmware version to AMM 702. System update program 115 on system board 105' subsequently queries AMM 702 for updates, locates the new firmware version, and flashes FRU 235 to update system board 105'.

Based on the foregoing, a computer system, method, and program product have been disclosed for updating a system board via a removable programmable storage device. However, numerous modifications and substitutions can be made without deviating from the scope of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. Therefore, the present invention has been disclosed by way of example and not limitation.

What is claimed is:

1. A method for updating firmware on a plurality of system boards of a computer, the method comprising the steps of:
   a first system board determining that a firmware update is available for the first system board, and in response, the first system board updating a firmware image on a portable and removable storage device which is currently plugged into the first system board within the computer to store the firmware update;
   during execution of a subsequent boot sequence for the computer, the first system board determining that (i) the firmware image on the first system board does not match the updated firmware image on the portable and removable storage device and (ii) the updated firmware image on the portable and removable storage device is a later version of the firmware image on the first system board, and in response to (i) and (ii), collectively, the first system board replacing the firmware image on the first system board with the updated firmware image on the portable and removable storage device; and subsequently,
   during execution of another boot sequence for the computer, a second system board, which has replaced the first system board in the computer and has the portable and removable storage device plugged into the second system board, determining (i) that the updated firmware image on the portable and removable storage device does not match a firmware image on the second system board, (ii) the updated firmware image on the portable and removable storage device is a later version of the firmware image on the second system board, and (iii) that vital product data (VPD) on the second system board does not match vital product data on the portable and removable storage device, and in response to (i), (ii), and (iii), collectively, the second system board replacing the firmware image on the second system board with the updated firmware image from the portable and removable storage device and replacing the vital product data on the second system board with the vital product data on the portable and removable storage device.

2. The method of claim 1, further comprising the steps of: the second system board determining that user configurable settings on the second system board do not match user configurable settings on the portable and removable storage device, and in response, the second system board replacing the user configurable settings on the second system board with the user configurable settings on the portable and removable storage device.

3. The method of claim 1, wherein the firmware images of both the second system board and the portable and removable storage device are selected from the group consisting of United Extensible Firmware Interface (UEFI) firmware, Basic Input/Output System (BIOS) firmware, diagnostics firmware, Integrated Management Module firmware, and Baseboard Management Controller (BMC) firmware.

4. The method of claim 1, further comprising the step of, prior to the step of determining that the firmware image on the first system board does not match the firmware image on the portable and removable storage device, the first system board querying a management module managing a system of computers for an updated firmware image, and in response to locating the updated firmware image, flashing the updated firmware image to the portable and removable storage device.

5. A computer system comprising one or more processors, one or more computer-readable memories, and one or more computer-readable tangible storage devices; and
   program instructions which are stored on the one or more storage devices for execution by the one or more processors via the one or more memories and when executed by the one or more processors perform the method of claim 1.

6. A computer program product comprising one or more computer-readable tangible storage devices and computer-readable program instructions which are stored on the one or more storage devices and when executed by one or more processors of the computer of claim 1 perform the method of claim 1.

7. A method for updating firmware on a computer, the method comprising the steps of:
   during execution of a boot sequence for the computer, comparing, by one or more computer processors, a firmware image on a portable and removable storage device plugged into a first system board, to a firmware image on the first system board within the computer;
   determining, by one or more computer processors, that the firmware image on the first system board is a later version of the firmware image on the portable and removable storage device, and in response, the first system board updating the firmware image on the portable and removable storage device with the firmware image on the first system board and replacing vital product data (VPD) and user configurable settings on the portable and removable storage device with VPD and user configurable settings from the first system board; and subsequently,
   during execution of another boot sequence for the computer, a second system board, which has replaced the first system board in the computer and has the portable and removable storage device plugged into the second system board, determining (i) that the updated firmware image on the portable and removable storage device does not match a firmware image on the second system board and (ii) the updated firmware image on the portable and removable storage device is a later version of the firmware image on the second system board, and in response to (i) and (ii), collectively, the second system board replacing the firmware image on the second system board with the updated firmware image from the portable and removable storage device.

8. The method of claim 7, further comprising:
in response to determining that the firmware image on the first system board is a later version of the firmware image on the portable and removable storage device:
sending the firmware image on the first system board to a management module managing a system of computers; and
the management module distributing the received firmware image to at least one other computer in the system of computers.

9. The method of claim 7, further comprising:
in response to determining that the firmware image on the portable and removable storage device is a later version of the firmware image on the second system board, replacing vital product data (VPD) and user configurable settings on the second system board with VPD and user configurable settings from the removable storage device.

10. A computer system for updating firmware on a system board of a computer, the computer system comprising:
one or more computer processors, one or more computer-readable memories, one or more computer-readable tangible storage devices, and program instructions stored on at least one of the one or more computer-readable tangible storage devices for execution by at least one of the one or more computer processors via at least one of the one or more memories, the program instructions comprising:
program instructions, operative during execution of a boot sequence for the computer, to compare a firmware image on a portable and removable storage device plugged into a first system board, to a firmware image on the first system board;
program instructions to determine that the firmware image on the first system board is a later version of the firmware image on the portable and removable storage device, and in response, update the firmware image on the portable and removable storage device with the firmware image on the first system board and replace vital product data (VPD) and user configurable settings on the portable and removable storage device with VPD and user configurable settings from the first system board; and
program instructions to, subsequent to updating the firmware image on the portable and removable storage device with the firmware image on the first system board, and during execution of another boot sequence for the computer, determine (i) that the updated firmware image on the portable and removable storage device does not match a firmware image on a second system board, which has replaced the first system board in the computer and has the portable and removable storage device plugged into the second system board, and (ii) that the updated firmware image on the portable and removable storage device is a later version of the firmware image on the second system board, and in response to (i) and (ii), collectively, replace the firmware image on the second system board with the updated firmware image from the portable and removable storage device.

11. The computer system of claim 10, further comprising program instructions, stored on at least one of the one or more computer-readable tangible storage devices for execution by at least one of the one or more computer processors via at least one of the one or more memories, to:
in response to determining that the firmware image on the first system board is a later version of the firmware image on the portable and removable storage device:
send the firmware image on the first system board to a management module managing a system of computers; and
distribute, from the management module, the received firmware image to at least one other computer in the system of computers.

12. The computer system of claim 10, further comprising program instructions, stored on at least one of the one or more computer-readable tangible storage devices for execution by at least one of the one or more computer processors via at least one of the one or more memories, to:
in response to determining that the firmware image on the portable and removable storage device is a later version of the firmware image on the second system board, replace vital product data (VPD) and user configurable settings on the second system board with VPD and user configurable settings from the removable storage device.

* * * * *